(12) United States Patent
Herklots et al.

(10) Patent No.: US 12,202,959 B2
(45) Date of Patent: Jan. 21, 2025

(54) COMPOSITION COMPRISING HETEROPHASIC PROPYLENE COPOLYMER

(71) Applicant: SABIC GLOBAL TECHNOLOGIES B.V., Bergen op Zoom (NL)

(72) Inventors: Marc Herklots, Geleen (NL); Daniel Bande, Geleen (NL); Ginger De La Croix, Geleen (NL); Dimphna Johanna Maria Van Beek, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 683 days.

(21) Appl. No.: 17/431,651

(22) PCT Filed: Feb. 11, 2020

(86) PCT No.: PCT/EP2020/053413
§ 371 (c)(1),
(2) Date: Aug. 17, 2021

(87) PCT Pub. No.: WO2020/169402
PCT Pub. Date: Aug. 27, 2020

(65) Prior Publication Data
US 2022/0251359 A1 Aug. 11, 2022

(30) Foreign Application Priority Data
Feb. 18, 2019 (EP) .................................... 19157835

(51) Int. Cl.
| | |
|---|---|
| C08L 23/12 | (2006.01) |
| C08K 3/34 | (2006.01) |
| C08K 5/098 | (2006.01) |
| C08K 5/20 | (2006.01) |
| C08L 23/08 | (2006.01) |
| C08L 23/16 | (2006.01) |

(52) U.S. Cl.
CPC ............... *C08L 23/16* (2013.01); *C08K 3/34* (2013.01); *C08K 5/098* (2013.01); *C08K 5/20* (2013.01); *C08L 23/0815* (2013.01); *C08L 23/12* (2013.01); *C08L 2205/03* (2013.01); *C08L 2205/22* (2013.01); *C08L 2207/02* (2013.01)

(58) Field of Classification Search
CPC ...... C08L 23/12; C08L 23/16; C08L 23/0815; C08L 2207/02; C08K 5/0083; C08K 5/098; C08K 5/0075; C08K 5/20
See application file for complete search history.

(56) References Cited

U.S. PATENT DOCUMENTS

| | | |
|---|---|---|
| 4,282,076 A | 8/1981 | Boynton |
| 4,399,054 A | 8/1983 | Ferraris et al. |
| 4,463,113 A | 7/1984 | Nakahara et al. |
| 4,472,524 A | 9/1984 | Albizzati |
| 5,017,714 A | 5/1991 | Welborn, Jr. |
| 5,049,605 A | 9/1991 | Rekers |
| 5,342,868 A | 8/1994 | Kimura et al. |

(Continued)

FOREIGN PATENT DOCUMENTS

| | | |
|---|---|---|
| EP | 0063654 A1 | 11/1982 |
| EP | 0940431 A1 | 9/1999 |

(Continued)

OTHER PUBLICATIONS

International Search Report for International Application No. PCT/EP2020/053413, International Filing Date Feb. 11, 2020, Date of Mailing Mar. 11, 2020, 4 pages.
Ser van der Ven, "Polypropylene and other Polyolefins: Polymerization and Characterization," Studies in Polymer Science 7, Elsevier (1990), pp. 1-11.

(Continued)

*Primary Examiner* — Rip A Lee
(74) *Attorney, Agent, or Firm* — CANTOR COLBURN LLP

(57) ABSTRACT

The invention relates to a composition comprising (A) a heterophasic propylene copolymer and (B) an ethylene copolymer of ethylene and an alpha-olefin comonomer units having 4 to 10 carbon atoms, wherein (A) the heterophasic propylene copolymer consists of (a) a propylene-based matrix, wherein the propylene-based matrix consists of a propylene homopolymer and/or a propylene copolymer consisting of at least 70 wt % of propylene monomer units and at most 30 wt % of ethylene and/or α-olefin monomer units, based on the total weight of the propylene-based matrix and wherein the propylene-based matrix is present in an amount of 80 to 95 wt % based on the total heterophasic propylene copolymer and (b) a dispersed ethylene-α-olefin copolymer, wherein the dispersed O ethylene-α-olefin copolymer is present in an amount of 5 to 20 wt %, preferably 8 to 15 wt %, based on the total heterophasic propylene copolymer and wherein the sum of the total amount of propylene-based matrix and total amount of the dispersed ethylene-α-olefin copolymer in the heterophasic propylene copolymer is 100 wt %, wherein the amount of ethylene in the ethylene-α-olefin copolymer of the heterophasic propylene copolymer is 10 to 45 wt %, preferably 30 to 38 wt %, and wherein (B) the ethylene copolymer has a density of to 0.850 to 0.910 g/cm3 and a melt flow index of 10.0 to 50.0 dg/min, preferably 30.0 dg/min, measured in accordance with ASTM D1238 (2.16 kg/190° C.), wherein the composition comprises less than 5 wt % of talc with respect to the total composition.

17 Claims, No Drawings

(56) References Cited

U.S. PATENT DOCUMENTS

| | | | |
|---|---|---|---|
| 6,465,551 B1 | 10/2002 | Zhao et al. | |
| 6,534,574 B1 | 3/2003 | Zhao et al. | |
| 8,816,010 B2 * | 8/2014 | Tranninger | C08L 23/12 |
| | | | 524/451 |
| 9,290,649 B2 * | 3/2016 | Tranninger | C08F 2/001 |
| 9,382,410 B2 * | 7/2016 | Bernreitner | C08L 23/142 |
| 9,487,648 B2 * | 11/2016 | Gahleitner | C08F 210/06 |
| 9,557,095 B2 * | 3/2017 | Tranninger | C08L 23/12 |
| 9,611,382 B2 * | 4/2017 | Kock | C08L 23/0815 |
| 10,240,024 B2 * | 3/2019 | Vandewiele | C08K 3/346 |
| 10,308,797 B2 * | 6/2019 | Lummerstorfer | C08L 23/14 |
| 10,696,834 B2 * | 6/2020 | Grestenberger | C08L 23/16 |
| 10,703,891 B2 * | 7/2020 | Herklots | C08L 23/142 |
| 10,995,206 B2 * | 5/2021 | Herklots | C08L 23/12 |
| 11,136,446 B2 * | 10/2021 | Vandewiele | C08L 23/12 |
| 2016/0122505 A1 * | 5/2016 | Vandewiele | C08L 23/12 |
| | | | 106/316 |
| 2020/0270435 A1 * | 8/2020 | Alvarez | C08L 23/142 |
| 2021/0363314 A1 * | 11/2021 | Wang | C08L 23/14 |

FOREIGN PATENT DOCUMENTS

| | | | | |
|---|---|---|---|---|
| EP | 2348058 A1 * | 7/2011 | | C08F 10/06 |
| EP | 2551299 A1 * | 1/2013 | | C08L 23/10 |
| EP | 2586823 A1 * | 5/2013 | | C08F 210/06 |
| EP | 2586825 A1 * | 5/2013 | | C08L 23/14 |
| WO | 2004072168 A2 | 8/2004 | | |
| WO | 2006010414 A1 | 2/2006 | | |
| WO | WO-2011076555 A1 * | 6/2011 | | C08L 23/12 |
| WO | WO-2013041507 A * | 3/2013 | | C08L 23/10 |
| WO | WO-2013041507 A1 * | 3/2013 | | C08F 110/06 |
| WO | 2014202603 A1 | 12/2014 | | |
| WO | 2014202604 A1 | 12/2014 | | |
| WO | WO-2015077902 A1 * | 6/2015 | | C08F 210/06 |
| WO | 2016095225 A1 | 6/2016 | | |
| WO | WO 2017/025268 A1 * | 2/2017 | | C08L 23/12 |
| WO | 2017060139 A1 | 4/2017 | | |
| WO | 2017144475 A1 | 8/2017 | | |
| WO | 2018206353 A1 | 11/2018 | | |
| WO | WO-2020107303 A1 * | 6/2020 | | C08K 3/34 |
| WO | WO-2021037565 A1 * | 3/2021 | | C08F 6/005 |

OTHER PUBLICATIONS

Written Opinion for International Application No. PCT/EP2020/053413, International Filing Date Feb. 11, 2020, Date of Mailing Mar. 11, 2020, 4 pages.

* cited by examiner

COMPOSITION COMPRISING HETEROPHASIC PROPYLENE COPOLYMER

CROSS REFERENCE TO RELATED APPLICATIONS

This application is a National Stage application of PCT/EP2020/053413, filed Feb. 11, 2020, which claims the benefit of European Application No. 19157835.0, filed Feb. 18, 2019, both of which are incorporated by reference in their entirety herein.

The invention relates to a composition comprising a heterophasic propylene copolymer, to a process for obtaining such composition and to the use of such composition.

In recent years, there is a trend in European car segments A and B to use color to differentiate brand perception. Also many OEM's offer final customers the possibility to customize the interior of the cars, offering different accessory and equipment packages and color options.

Current solutions used in automotive interiors are PC+ABS painted parts or PP compositions which are not glossy and are mostly in black color. Painted parts considerably increase the cost of the parts and have a potential impact in environment due to the use of paints, solvents and other harmful chemical products. General heterophasic polypropylene copolymers have a low gloss which gives a cheap impression and have low impact performance. Addition of impact modifier to a heterophasic propylene copolymer for increasing impact properties tends to lower the gloss of the resulting composition.

Attempts to improve optical properties and mechanical properties of compositions comprising a heterophasic propylene copolymer have been described in a number of patents.

WO2017/025268A1 discloses a composition comprising a heterophasic propylene copolymer and an C2-C8 elastomer. In the experiments, heterophasic propylene copolymers comprising 25 wt % of a dispersed phase of ethylene-propylene copolymer wherein the ethylene content in the dispersed phase is 20% were used. The MFI of these heterophasic propylene copolymers was 4 dg/min and 33 dg/min at 230° C./2.16 kg. One of the C2-C8 elastomers (Engage 8407) has an MFI of 30 dg/min at 190° C./2.16 kg and a density of 0.87 g/cm$^3$.

WO2017/144475A1 discloses a composition comprising a heterophasic propylene copolymer, a slip agent (erucamide) and a nucleating agent HPN-20E and talc.

It is an objective of the present invention to provide a composition which has suitable properties for use in automotive interior applications, such as a high gloss, sufficient stiffness and sufficient impact strength. The composition desirably further has high scratch resistance as well as low shrinkage.

Accordingly, the invention provides a composition comprising (A) a heterophasic propylene copolymer and (B) an ethylene copolymer of ethylene and an alpha-olefin comonomer units having 4 to 10 carbon atoms,
wherein (A) the heterophasic propylene copolymer consists of
(a) a propylene-based matrix,
wherein the propylene-based matrix consists of a propylene homopolymer and/or a propylene copolymer consisting of at least 70 wt % of propylene monomer units and at most 30 wt % of ethylene and/or α-olefin monomer units, based on the total weight of the propylene-based matrix and
wherein the propylene-based matrix is present in an amount of 80 to 95 wt % based on the total heterophasic propylene copolymer and
(b) a dispersed ethylene-α-olefin copolymer,
wherein the dispersed ethylene-α-olefin copolymer is present in an amount of 5 to 20 wt % based on the total heterophasic propylene copolymer and
wherein the sum of the total amount of propylene-based matrix and total amount of the dispersed ethylene-α-olefin copolymer in the heterophasic propylene copolymer is 100 wt %,
wherein the amount of ethylene in the ethylene-α-olefin copolymer of the heterophasic propylene copolymer is 10 to 45 wt %, preferably 30 to 38 wt %, with respect to the ethylene-α-olefin copolymer and
wherein (B) the ethylene copolymer has a density of to 0.850 to 0.910 g/cm$^3$ and a melt flow index of 10.0 to 50.0 dg/min, preferably 30.0 dg/min, measured in accordance with ASTM D1238 (2.16 kg/190° C.),
wherein the composition comprises less than 5 wt % of talc with respect to the total composition.

The composition surprisingly shows a good combination of optical and mechanical properties such as gloss, impact strength, stiffness, scratch resistance and shrinkage.

It was further found that the presence of talc, if any, should be limited in order to achieve the desirable properties.

(A) Heterophasic Propylene Copolymer

The major portion of the composition according to the invention is (A) a heterophasic propylene copolymer.

Heterophasic propylene copolymers are generally prepared in one or more reactors, by polymerization of propylene in the presence of a catalyst and subsequent polymerization of an ethylene-α-olefin mixture. The resulting polymeric materials are heterophasic, but the specific morphology usually depends on the preparation method and monomer ratios used.

The heterophasic propylene copolymers employed in the process according to present invention can be produced using any conventional technique known to the skilled person, for example multistage process polymerization, such as bulk polymerization, gas phase polymerization, slurry polymerization, solution polymerization or any combinations thereof. Any conventional catalyst systems, for example, Ziegler-Natta or metallocene may be used. Such techniques and catalysts are described, for example, in WO06/010414; Polypropylene and other Polyolefins, by Ser van der Ven, Studies in Polymer Science 7, Elsevier 1990; WO06/010414, U.S. Pat. Nos. 4,399,054 and 4,472,524. Preferably, the heterophasic propylene copolymer is made using Ziegler-Natta catalyst.

In one embodiment, the heterophasic propylene copolymer is made using a catalyst which is free of phthalate.

The heterophasic propylene copolymer may be prepared by a process comprising
polymerizing propylene and optionally ethylene and/or α-olefin in the presence of a catalyst system to obtain the propylene-based matrix and
subsequently polymerizing ethylene and α-olefin in the propylene-based matrix in the presence of a catalyst system to obtain the dispersed ethylene-α olefin copolymer.
These steps are preferably performed in different reactors. The catalyst systems for the first step and for the second step may be different or same.

The heterophasic propylene copolymer of the composition of the invention consists of a propylene-based matrix and a dispersed ethylene-α-olefin copolymer. The propylene-based matrix typically forms the continuous phase in the heterophasic propylene copolymer. The amounts of the propylene-based matrix and the dispersed ethylene-α-olefin copolymer may be determined by $^{13}$C-NMR, as well known in the art.

The propylene-based matrix consists of a propylene homopolymer and/or a propylene copolymer consisting of at least 90 wt % of propylene monomer units and at most 10 wt % of comonomer units selected from ethylene monomer units and α-olefin monomer units having 4 to 10 carbon atoms, for example consisting of at least 93 wt % of propylene monomer units and at most 7 wt % of the comonomer units, at least 95 wt % of propylene monomer units and at most 5 wt % of the comonomer units or at least 96 wt % of propylene monomer units and at most 4 wt % of the comonomer units, based on the total weight of the propylene-based matrix.

Preferably, the comonomer in the propylene copolymer of the propylene-based matrix is selected from the group of ethylene, 1-butene, 1-pentene, 4-methyl-1-pentene, 1-hexen, 1-heptene and 1-octene, and is preferably ethylene.

Preferably, the propylene-based matrix consists of a propylene homopolymer. The fact that the propylene-based matrix consists of a propylene homopolymer is advantageous in that a higher stiffness is obtained compared to the case where the propylene-based matrix is a propylene-α-olefin copolymer.

The melt flow index (MFI) of the propylene-based matrix (before the heterophasic propylene copolymer is mixed into the composition of the invention), $MFI_{pp}$, may be for example at least 0.1 dg/min, at least 0.2 dg/min, at least 0.3 dg/min, at least 0.5 dg/min, at least 1 dg/min, at least 1.5 dg/min, and/or for example at most 50 dg/min, at most 40 dg/min, at most 30 dg/min, at most 25 dg/min, at most 20 dg/min, measured according to ISO1133-1:2011 (2.16 kg/230° C.). The $MFI_{pp}$ may be in the range of for example 0.1 to 50 dg/min, for example from 0.2 to 40 dg/min, for example 0.3 to 30 dg/min, for example 0.5 to 25 dg/min, for example from 1 to 20 dg/min, for example from 1.5 to 10 dg/min, measured according to ISO1133-1:2011 (2.16 kg/230° C.).

The propylene-based matrix is present in an amount of 80 to 95 wt %. Preferably, the propylene-based matrix is present in an amount of 85 to 92 wt % based on the total heterophasic propylene copolymer.

The propylene-based matrix is preferably semi-crystalline, that is it is not 100% amorphous, nor is it 100% crystalline. For example, the propylene-based matrix is at least 40% crystalline, for example at least 50%, for example at least 60% crystalline and/or for example at most 80% crystalline, for example at most 70% crystalline. For example, the propylene-based matrix has a crystallinity of 60 to 70%. For purpose of the invention, the degree of crystallinity of the propylene-based matrix is measured using differential scanning calorimetry (DSC) according to ISO11357-1 and ISO11357-3 of 1997, using a scan rate of 10° C./min, a sample of 5 mg and the second heating curve using as a theoretical standard for a 100% crystalline material 207.1 J/g.

Besides the propylene-based matrix, the heterophasic propylene copolymer also comprises a dispersed ethylene-α-olefin copolymer. The dispersed ethylene-α-olefin copolymer is also referred to herein as the 'dispersed phase'. The dispersed phase is embedded in the heterophasic propylene copolymer in a discontinuous form. The particle size of the dispersed phase is typically in the range of 0.05 to 2.0 microns, as may be determined by transmission electron microscopy (TEM). The amount of the dispersed ethylene-α-olefin copolymer in the heterophasic propylene copolymer may herein be sometimes referred as RC.

The amount of ethylene monomer units in the ethylene-α-olefin copolymer is 10 to 45 wt %, for example from 20 to 40 wt %, for example from 30 to 38 wt %. In one embodiment, the amount of ethylene monomer units in the ethylene-α-olefin copolymer is 11 to 45 wt %, for example from 20 to 40 wt %, for example from 30 to 38 wt %. In another embodiment, the amount of ethylene monomer units in the ethylene-α-olefin copolymer is 14 to 45 wt %, for example from 20 to 40 wt %, for example from 30 to 38 wt %. Preferably the amount of ethylene monomer units in the ethylene-α-olefin copolymer is at least 15 wt %, preferably at least 20 wt %, preferably at least 30 wt %, and/or preferably at most 40 wt %, preferably at most 38 wt %. The amount of ethylene monomer units in the dispersed ethylene-α-olefin copolymer in the heterophasic propylene copolymer may herein be sometimes referred as RCC2.

The α-olefin in the ethylene-α-olefin copolymer is preferably chosen from the group of α-olefins having 3 to 8 carbon atoms. Examples of suitable α-olefins having 3 to 8 carbon atoms include but are not limited to propylene, 1-butene, 1-pentene, 4-methyl-1-pentene, 1-hexen, 1-heptene and 1-octene. More preferably, the α-olefin in the ethylene-α-olefin copolymer is chosen from the group of α-olefins having 3 to 4 carbon atoms and any mixture thereof, more preferably the α-olefin is propylene, in which case the ethylene-α-olefin copolymer is ethylene-propylene copolymer.

The MFI of the dispersed ethylene α-olefin copolymer (before the heterophasic propylene copolymer is mixed into the composition of the invention), MFIrubber, may be for example at least 0.001 dg/min, at least 0.01 dg/min, at least 0.1 dg/min, at least 0.3 dg/min, at least 0.7 dg/min, at least 1 dg/min, and/or for example at most 30 dg/min, at most 20 dg/min, at most 15 dg/min at most 10 dg/min, at most 5 dg/min or at most 3 dg/min. The MFIrubber may be in the range for example from 0.001 to 30 dg/min, for example from 0.01 to 20 dg/min, for example 0.1 to 15 dg/min, for example 0.3 to 10 dg/min, for example from 0.7 to 5 dg/min, for example from 1 to 3 dg/min. MFIrubber is calculated according to the following formula:

$$MFIrubber = 10^{\wedge}\left(\frac{MFIheterophasic - \text{matrix content} * \text{Log } MFImatrix}{\text{rubber content}}\right)$$

wherein
MFI heterophasic is the MFI (dg/min) of the heterophasic propylene copolymer measured according to ISO1133-1:2011 (2.16kg/230° C.), MFImatrix is the MFI (dg/min) of the propylene-based matrix measured according to ISO1133-1:2011 (2.16kg/230° C.),
matrix content is the amount (wt %) of the propylene-based matrix in the heterophasic propylene copolymer,
rubber content is the amount (wt %) of the dispersed ethylene-α-olefin copolymer in the heterophasic propylene copolymer. For the avoidance of any doubt, Log in the formula means $\log_{10}$.

The dispersed ethylene-α-olefin copolymer is present in an amount of 5 to 20 wt %. Preferably, the dispersed ethylene-α-olefin copolymer is present in an amount of 8 to 15 wt % based on the total heterophasic propylene copolymer.

In the heterophasic propylene copolymer in the composition of the invention, the sum of the total weight of the propylene-based matrix and the total weight of the dispersed ethylene-α-olefin copolymer is 100 wt % of the heterophasic propylene copolymer.

It is common general knowledge that in a heterophasic propylene copolymer, the propylene-based matrix and the dispersed ethylene-α-olefin copolymer are not the same, since if the propylene-based matrix and the dispersed ethylene-α-olefin copolymer are the same, they would be miscible with each other and therefore would not form a heterophasic system.

Preferably, the heterophasic propylene copolymer has a fraction soluble in p-xylene at 25° C. (CXS) measured according to ISO 16152:2005 of 5 to 20 wt %. More preferably, the heterophasic propylene copolymer has CXS of 8 to 15 wt %.

Preferably, the amount of ethylene monomer units in the heterophasic propylene copolymer (sometimes referred as TC2) is in the range of 3 to 6 wt % based on the heterophasic propylene copolymer.

The MFI of the heterophasic propylene copolymer may be for example at least 0.1 dg/min, at least 0.2 dg/min, at least 0.3 dg/min, at least 0.5 dg/min, at least 1 dg/min at least 1.5 dg/min, at least 5 dg/min or at least 10 dg/min, and/or for example at most 100 dg/min, at most 50 dg/min, at most 40 dg/min, at most 30 dg/min, at most 25 dg/min, at most 20 dg/min or at most 10 dg/min, measured according to ISO1133-1:2011 (2.16 kg/230° C.). In some embodiments, the MFI of the heterophasic propylene copolymer may be in the range of 10 to 100 dg/min, measured according to ISO1133-1:2011 (2.16 kg/230° C.). Such a range of MFI is suitable for injection moulding.

The values of the MFI of the propylene-based matrix ($MFI_{pp}$) and the MFI of the dispersed ethylene-α-olefin elastomer ($MFI_{EPR}$) mentioned herein are understood as the values before the heterophasic propylene copolymer is mixed with component (B) and optional component(s) to obtain the composition according to the invention. The value of the MFI of the heterophasic propylene copolymer (MFI heterophasic) refers to the final MFI of the heterophasic propylene copolymer. To exemplify this:
In case the heterophasic propylene copolymer is not subjected to vis-breaking or shifting by melt-mixing with a peroxide, the MFIheterophasic is the original MFI value of the heterophasic propylene copolymer. In case the heterophasic propylene copolymer is subjected to vis-breaking or shifting by melt-mixing with a peroxide, the MFIheterophasic is the value of the heterophasic propylene copolymer after such vis-breaking or shifting.

Preferably, in the heterophasic propylene copolymer used according to the invention, the comonomer in the propylene-α-olefin copolymer is selected from ethylene and the group of α-olefins having 4 to 10 carbon atoms and
the comonomer in the ethylene-α-olefin copolymer is selected from the group of α-olefins having 3 to 8 carbon atoms.

Preferably, in the heterophasic propylene copolymer used according to the invention, the comonomer in the propylene-α-olefin copolymer is selected from ethylene and the group of α-olefins having 4 to 10 carbon atoms and
the comonomer in the ethylene-α-olefin copolymer is selected from the group of α-olefins having 3 to 8 carbon atoms.

Preferably, the propylene-based matrix is a propylene homopolymer and the dispersed ethylene-α-olefin copolymer is an ethylene-propylene copolymer.

Preferably, the amount of (A) in the composition according to the invention is at least 85 wt %, for example 90 to 99 wt % or 92 to 97 wt % with respect to the total composition.

(B) Ethylene Copolymer

The composition of the invention comprises (B) an ethylene copolymer of ethylene and an α-olefin comonomer having 4 to 10 carbon atoms.

The α-olefin comonomer in the ethylene copolymer preferably has 4 to 8 carbon atoms and is preferably an acyclic monoolefin such as 1-butene, 1-pentene, 1-hexene, 1-octene, or 4-methyl-1-pentene.

The ethylene copolymer is preferably selected from the group consisting of ethylene-1-butene copolymer, ethylene-1-hexene copolymer, ethylene-1-octene copolymer and mixtures thereof. Most preferably, the ethylene copolymer is an ethylene-1-octene copolymer.

The ethylene copolymer has a density of 0.850 to 0.910 g/cm$^3$. Preferably, the density of the ethylene copolymer is 0.850 to 0.890 g/cm$^3$, for example 0.855 to 0.880 g/cm$^3$ or 0.860 to 0.875 g/cm$^3$. This was found to result in a composition with a very high impact strength.

The ethylene copolymer has a melt flow index of 5 to 50 dg/min measured in accordance with ASTM D1238 using a 2.16 kg weight and at a temperature of 190° C. Preferably, the melt flow index of the ethylene copolymer is for example at least 7 dg/min, at least 10 dg/min, at least 15 dg/min, at least 20 dg/min, at least 25 dg/min, at least 27 dg/min and/or for example at most 45 dg/min, at most 40 dg/min, at most 35 dg/min, at most 33 dg/min, at most 30 dg/min measured in accordance with ASTM D1238 using a 2.16 kg weight and at a temperature of 190° C.

The ethylene copolymers which are suitable for use in the current invention are commercially available for example under the trademark ENGAGE™ 8402, ENGAGE™ 8407 and SABIC® FORTIFY™ C30070D.

The ethylene copolymers may be prepared using methods known in the art, for example by using a single site catalyst, i.e., a catalyst the transition metal components of which is an organometallic compound and at least one ligand of which has a cyclopentadienyl anion structure through which such ligand bondingly coordinates to the transition metal cation. This type of catalyst is also known as "metallocene" catalyst. Metallocene catalysts are for example described in U.S. Pat. Nos. 5,017,714 and 5,324,820. The elastomers may also be prepared using traditional types of heterogeneous multi-sited Ziegler-Natta catalysts.

Preferably, the amount of (B) is 1 to 10 wt %, for example 3 to 8 wt %, with respect to the total composition.

Preferably, the amount of the total amount of (A) and (B) is at least 95 wt %, for example 96 to 99 wt %, with respect to the total composition.

The composition according to the invention is free of talc or comprises only a limited amount of talc. The composition comprises less than 5 wt % of talc with respect to the total composition. Preferably, the composition comprises less than 3 wt % or less than 1 wt % of talc with respect to the total composition. Preferably, the amount of talc in the composition is less than 50000 ppm with respect to the amount of (A) in the total composition. Preferably, the amount of talc in the composition is 1000 to 50000 ppm, more preferably 1500 to 30000 ppm or 3000 to 10000 ppm, with respect to the amount of (A) in the total composition.

Preferably, the composition according to the invention is free of any inorganic fillers including talc and glass fillers or comprises only a limited amount of inorganic fillers. Accordingly, the composition preferably comprises less than 5 wt %, less than 3 wt % or less than 1 wt % of an inorganic filler with respect to the total composition, i.e. the total amount of talc and any other inorganic fillers is less than 5 wt %, less than 3 wt % or less than 1 wt % with respect to the total composition.

(C) Amide

Preferably, the composition according to the invention further comprises (C) a C10-C30 aliphatic carboxylic acid amide. The presence of (C) is advantageous in that the scratch resistance of the composition is improved. A C10-C30 aliphatic carboxylic acid amide has an amide group CONH2 group and a long alkyl tail. The C10-C30 carboxylic acid amide is represented by the formula $R^1$-CONH2, wherein $R^1$ is a linear or branched C9-C29 alkyl group. The C10-C30 aliphatic carboxylic acid amide can be saturated C10-30 carboxylic acid amides or unsaturated C10-C30 carboxylic acid amides or mixtures thereof. In the unsaturated carboxylic acid amides at least one carbon-carbon double bond is present in the long alkyl tail.

Examples of saturated carboxylic acid amides are stearamide, palmitamide, cocamide, lauricamide, myristamide, capricamide, tallowamide, myristicamide, margaric (daturic) amide, arachidic amide, behenic amide, lignoceric amide, cerotic amide, montanic amide, melissic amide, lacceroic amide, ceromelissic (psyllic) amide, geddic amide and 9-octadecen amide.

Examples of unsaturated carboxylic acid amides are oleamide, linoleic amide, erucamide, myristoleic amide, palmitoleicamide, sapienic amide, elaidic amide, vaccenic amide, arachidonic amide, eicosapentaenoic amide and decosahexaenoic amide.

The number of carbon atoms in the carboxylic acid amides is 10-30, preferably 12-28, more preferably 14-26, most preferably 16-24.

The carboxylic acid amides are preferably unsaturated C10-C30 carboxylic acid amides, more preferably the carboxylic acid amides are chosen from erucamide and oleamide.

Preferably, the amount of (C) in the composition is to 100 to 10000 ppm, for example 500 to 8000 ppm, more preferably 1000 to 5000 ppm, with respect to the amount of (A) in the total composition.

(D) Nucleating Agent

Preferably, the composition according to the invention further comprises a nucleating agent.

For purpose of the invention with nucleating agent is meant any material that effectively accelerates the phase change from liquid polymer to semi-crystalline polymer (evident via faster crystallization rates measured with a differential scanning calorimeter or small crystallites observed with an optical microscope). For the avoidance of doubt, C10-C30 aliphatic carboxylic acid amides (component (C)) are not considered to be nucleating agents.

Other suitable examples of nucleating agents are 2,6-naphthalene dicarboxamides, aliphatic mono- and di- carboxylate salts such as calcium pimelate and calcium suberate; and polyvinylcyclohexane.

Phosphate esters suitable for use as the nucleating agent include, but are not limited to, sodium 2,2'-methylene-bis-(4,6-di- tert-butylphenyl)phosphate (from Asahi Denka Kogyo K. K., known as "NA- 11 (TM)"), aluminum hydroxy bis[2,2'-methylene-bis-(4,6-di -tert- butylphenyl) phosphate] (from Asahi Denka Kogyo K.K., known as "NA-21 (TM)"), and other such phosphate esters as disclosed for example in U.S. Pat. Nos. 5,342,868 and 4,463, 113.

Bicyclic dicarboxylate metal salts suitable for use as the nucleating agent include, but are not limited to, those salts described in U.S. Pat. Nos. 6,465,551 and 6,534,574. The bicyclic salts having the structure shown below:

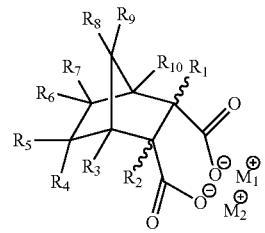

wherein $M_1$, and $M_2$ are independently selected from the group consisting of: sodium, calcium, strontium, lithium, zinc, magnesium, and monobasic aluminum; wherein $R_1$, $R_2$, $R_3$, $R_4$, $R_5$, $R_6$, R7, $R_8$, $R_9$, and $R_{10}$ are independently selected from the group consisting of: hydrogen and $C_1$-$C_9$ alkyls; and further wherein any two adjacently positioned $R_3$-$R_{10}$ alkyl groups optionally may be combined to form a carbocyclic ring.

In particular, suitable bicyclic dicarboxylate metal salts include disodium bicyclo[2.2.1]heptane-2,3- dicarboxylate, calcium bicyclo[2.2.1]heptane-2,3-dicarboxylate, and combinations thereof. One may employ HYPERFORM(R) HPN-68 or HPN-68L from Milliken & Company of Spartanburg, South Carolina HPN-68L is commercially sold, and comprises the disodium bicyclo [2.2.1] heptane-2,3-dicarboxylate, as shown below:

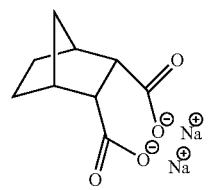 [SMILES: O=C([O-])C1C2CCC(C2)C1C(=O)[O-] ; [Na+] ; [Na+]]

Metal salts of hexahydrophthalic acid (HHPA) are known to the person skilled in the art. Such compounds may be as shown:

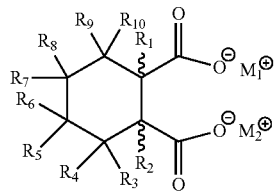

wherein $M_1$ and $M_2$ are the same or different, and may be combined into one cation, and are selected from at least one metal cation of calcium, strontium, lithium, and monobasic aluminum; and wherein $R_1$, $R_2$, $R_3$, $R_4$, $R_5$, $R_6$, $R_7$, $R_8$, $R_9$, and $R_{10}$ are either the same or different and are individually selected from the group consisting of hydrogen, $C_1$-$C_9$ alkyl, hydroxy, $C_1$-$C_9$ alkoxy, $C_1$-$C_9$ alkyleneoxy, amine, and $C_1$-$C_9$ alkylamine, halogens, and phenyl. In one preferred embodiment, the $M_1$ and $M_2$ are combined as a calcium ion.

Di-acetal derivatives, which may be used as nucleating agent include, but are not limited to, alditol acetals, such as the sorbitol di-acetals described in U.S. Pat. No. 5,049,605. Suitable di-acetal derivatives preferably conform to the formula

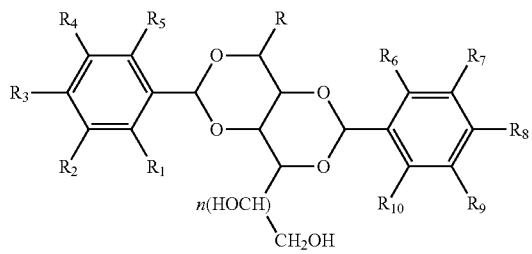

In this formula, n typically is a value selected from 0, 1 or 2. R typically is selected from the group consisting of hydrogen, alkenyl (such as allyl), alkyl, alkoxy, hydroxylalkyl, alkyl-halide, aromatic and substituted aromatic groups. $R_1$, $R_2$, $R_3$, $R_4$, $R_5$, $R_6$, $R_7$, $R_8$, $R_9$, and $R_{10}$ typically are independently selected from the group consisting of hydrogen, fluorocarbons, alkenyl, alkyl, alkynyl, alkoxy, carboxy, halides, amino, thioether and aromatic groups. In certain embodiments, any two adjacent groups selected from $R_1$, $R_2$, $R_3$, $R_4$, $R_5$, $R_6$, $R_7$, $R_8$, $R_9$, and $R_{10}$ may be combined to form a cyclic group selected from the group consisting of methylenedioxy, cyclopentyl, cyclohexyl, or other similar cyclic groups. In certain embodiments, the nucleating agent preferably is 1,3:2,4-bis (3,4-dimethylbenzylidene) sorbitol (hereinafter DMDBS), available from Miliiken Chemical under the trade name Millad(R) 3988.

Di-, tri-, and tetra-amides suitable for use as the nucleating agent include, but are not limited to: di- and tri-amides containing amide cores comprised of either single and fused 4,5,6,7-membered aromatic or cycloaliphatic rings; di- and tri-amides containing amide cores comprised of di and tri aliphatic carboxylic acids or di and tri aliphatic amines; and tri- and tetra- amides containing amide cores comprised of aliphatic tri-and tetracarboxylic acids and aliphatic or cycloaliphatic amines. These compounds are exemplified in patent publications, including WO 2004072168, EP 0940431 and WO 200506387.

In particular, the composition according to the invention may comprise a nucleating composition comprising a first nucleating agent, which comprises a cyclic dicarboxylate salt compound; and a second nucleating agent, which comprises talc, wherein the cyclic dicarboxylate salt compound has the formula (I):

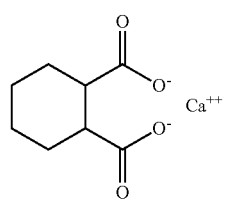 [SMILES: O=C([O-])C1CCCCC1C(=O)[O-] ; [Ca+2]]

Such nucleating compositions are as described in WO2014202603 and WO2014202604.

Hyperform® HPN-20E™ nucleating agent commercialized by Milliken comprises such a calcium cis-hexahydrophthalate compound of Formula (I) and a stearate-containing compound as acid scavenger, e.g. zinc stearate. The amount of the first nucleating agent may be from 25 to 1000 ppm with respect to the amount of (A) in the total composition; preferably at least 40 ppm, at least 50 ppm, at least 80 ppm or at least 100 ppm and/or at most 800 ppm, at most 600 ppm, at most 500 ppm or at most 300 ppm, with respect to the amount of (A) in the total composition. The amount of talc used as second nucleating agent in the composition is preferably 1000 to 50000 ppm, more preferably 1500 to 30000 ppm or 3000 to 10000 ppm, with respect to the amount of (A) in the total composition.

Preferably, the amount of (D) in the composition is 1000 to 51000 ppm, more preferably 1500 to 31000 ppm or 3000 to 11000 ppm, with respect to the amount of (A) in the total composition.

The presence of the nucleating composition in the composition according to the invention has an advantage that the composition has a high stiffness represented by the high flexural modulus.

(E) Additives

Peroxides

In some embodiments, the composition according to the invention can be obtained by melt-mixing a peroxide with component (A) and (B). The composition obtained by the addition of a peroxide has a different (higher) MFI from the MFI of the heterophasic copolymer used in preparing the composition. This step is also known in the art as visbreaking or shifting. The term "visbreaking" is well known in the field of the invention. For example methods of visbreaking polypropylene have been disclosed in U.S. Pat. No. 4,282,076 and EP 0063654. It is also possible to first melt-mix a peroxide with component (A), which changes the melt flow index of the heterophasic propylene copolymer, and then mix with component (B).

Examples of organic peroxides are well known and include dialkyl peroxides, e.g. dicumyl peroxides, peroxyketals, peroxycarbonates, diacyl peroxides, peroxyesters and peroxydicarbonates. Specific examples of these include benzoyl peroxide, dichlorobenzoyl peroxide, dicumyl peroxide, di-tert-butyl peroxide, 2,5-dimethyl-2,5-di(peroxybenzoato) -3-hexene, 1,4-bis(tert-butylperoxyisopropyl) benzene, lauroyl peroxide, tert-butyl peracetate, α,α'-bis (tert-butylperoxy)diisopropylbenzene (Luperco® 802), 2,5-dimethyl-2,5-di(tert-butylperoxy)-3-hexene, 2,5-dimethyl-2,5-di(tert-butylperoxy) -hexane, tert-butyl perbenzoate, tert-butyl perphenylacetate, tert-butyl per-sec-octoate, tert-butyl perpivalate, cumyl perpivalate.

It can easily be determined by the person skilled in the art through routine experimentation how much peroxide should be used to obtain a composition having the desired melt flow index. This also depends on the half-life of the peroxide and on the conditions used for the melt-mixing, which in turn depend on the exact composition of the heterophasic propylene copolymer.

When a peroxide is used, the amount of peroxide will typically lie in the range of 200 to 5000 ppm based on (A).

In some embodiments, the composition according to the invention is prepared without using a peroxide.

The composition according to the invention may optionally comprise further additives which are different from the components (A)-(D). The additives may include stabilizers, e.g. heat stabilisers, anti-oxidants, UV stabilizers; colorants, like pigments and dyes; clarifiers; surface tension modifiers; lubricants; flame-retardants; mould-release agents; flow improving agents; plasticizers; anti-static agents; blowing agents. Preferably, the composition according to the invention comprises a UV stabilizer.

The skilled person can readily select any suitable combination of additives and additive amounts without undue experimentation. The amount of the additives depends on their type and function and typically is of from 0 to about 5 wt %. The amount of the additives may e.g. be from about 0.01 to about 3 wt %; from about 0.1 to about 2 wt % or from 0.3 to about 1 wt % based on the total composition.

The sum of all components added in the process of the invention to form the composition comprising (A), (B), (C), (D) and (E) should add up to 100% by weight.

Properties

The MFI of the composition according to the invention may be for example at least 8 dg/min, at least 10 dg/min, at least 15 dg/min, at least 20 dg/min, or at least 25 dg/min and/or for example at most 100 dg/min or at most 50 dg/min, measured according to ISO1133-1:2011 (2.16 kg/230° C.). Such a range of MFI is suitable for injection moulding.

The composition according to the invention has a high gloss. Gloss is the amount of light reflected in a certain direction by a surface of a sample made from the composition. The measurement scale of gloss, Gloss Units (GU), of a glossmeter (BYK Gardner micro-TRI-gloss) is a scaling based on a highly polished reference black glass standard with a defined refractive index having a specular reflectance of 100GU at the specified angle. This standard is used to establish an upper point calibration of 100 with the lower end point established at 0 on a perfectly matte surface. The samples used for this test may be obtained by injection moulding ISO 37/2 on the machine Arburg 60T, mould: 1-1-1-108, with geometry 65*65*3.2 mm.

Preferably, the composition according to the invention has a gloss as determined according to ISO 2813 and DIN67530 at a measurement angle of 20° of at least 65 GU, more preferably at least 70 GU, more preferably at least 75 GU.

Preferably, the composition according to the invention has an Izod impact strength at 23° C. according to ISO 180 4A (test geometry: 651*2.7*3.2 mm, notch 45° according to ISO 37/2 perpendicular orientation) of at least 10 kJ/m$^2$, more preferably at least 15 kJ/m$^2$, more preferably at least 20 kJ/m$^2$, more preferably at least 25 kJ/m$^2$, more preferably at least 30 kJ/m$^2$.

Preferably, the composition according to the invention has an Izod impact strength at −20° C. according to ISO 180 4A (test geometry: 651*2.7*3.2 mm, notch 45° according to ISO 37/2 perpendicular orientation) of at least 3.0 kJ/m$^2$, more preferably at least 3.1 kJ/m$^2$.

Preferably, the composition according to the invention has a flexural modulus according to ISO178:2010 at 23° C. in parallel orientation (test specimen: 3.2 mm according to ISO 37/2) of at least 1250 MPa, more preferably at least 1300 MPa, most preferably at least 1400 MPa.

Preferably, the composition according to the invention has a scratch resistance expressed by a colour change dL of at most 1.40, more preferably at most 1.20, more preferably at most 1.00, as measured according to the PV 3952 2002 scratch method of Volkswagen AG company with a load of 10N, wherein the colour change dL is the difference in the L values of CIELAB measured according to ASTM D6290-05 and ASTM E313.

Preferably, the composition according to the invention has a scratch resistance expressed by a colour change dL of at most 1.40, more preferably at most 1.20, more preferably at most 1.00, as measured according to the PV 3952 2002 scratch method of Volkswagen AG company with a load of 15N, wherein the colour change dL is the difference in the L values of CIELAB measured according to ASTM D6290-05 and ASTM E313.

Process

The composition of the invention may be obtained by a process comprising melt-mixing (A) and (B) and the optional components (C), (D) and/or (E) by using any suitable means. Accordingly, the invention further relates to a process for the preparation of the composition according to the invention comprising melt mixing (A) and (B) and optionally (C), (D) and/or (E).

The melt-mixing of the components may be done in any order. For example, (A) and
(C), (D) and/or (E) may be melt-mixed before melt-mixing with (B). A composition of (A) and (C), (D) and/or (E) for example in the form of a pellet may first be obtained and then be melt-mixed with (B). Alternatively, components (A) and (B) are melt-mixed followed by the addition of (C), (D) and/or (E), or components (A) and (B) and (C), (D) and/or (E) are melt-mixed at the same time.

Preferably, the composition of the invention is made in a form that allows easy processing into a shaped article in a subsequent step, like in pellet or granular form. The composition can be a mixture of different particles or pellets; like a blend of the heterophasic copolymer and a masterbatch of additives. Preferably, the composition of the invention is in pellet or granular form as obtained by mixing all components in an apparatus like an extruder; the advantage being a composition with homogeneous and well-defined concentrations of the additives.

With melt-mixing is meant that (A) is melt-mixed with other components at a temperature that exceeds the melting point of (A). Melt-mixing may be done using techniques known to the skilled person, for example in an extruder. Generally, in the process of the invention, melt-mixing is performed at a temperature in the range of 200 to 260° C.

Suitable conditions for melt-mixing, such as temperature, pressure, amount of shear, screw speed and screw design when an extruder is used are known to the skilled person.

Further Aspects

The composition according to the invention may then be processed by any conventional technique known in the art into an article. Suitable examples of processing techniques wherein the composition according to the invention may be used include injection moulding, injection stretch blow moulding, compression moulding, extrusion and extrusion compression moulding, sheet extrusion, thermoforming or thin-walled injection moulding.

The invention further relates to an article comprising the composition according to the invention. In particular, the invention relates to an article comprising the composition according to the invention, wherein the article is made by one of the processing techniques mentioned above. Preferably, the article according to the invention is an automotive part, in particular an automotive interior part such as instrument panels, cap and closure. Alternatively, the article according to the invention is a home appliance.

The invention further relates to the use of the composition according to the invention for making an automotive part, in particular an automotive interior part such as instrument panels, cap and closure, or a home appliance.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

EXPERIMENTS

Heterophasic Propylene Copolymer

Heterophasic propylene copolymer consisting of a matrix of a propylene homopolymer and a dispersed ethylene-propylene copolymer was used. The amount (RC) of the dispersed ethylene-propylene copolymer was 11.0 wt %. The amount (RCC2) of ethylene in the dispersed ethylene-propylene copolymer was 34.0 wt %. Thus, the amount (TC2) of ethylene in the heterophasic propylene copolymer was 3.7 wt %.

The MFI of the matrix was 9.0 dg/min measured in accordance with ISO1133-1:2011using a 2.16 kg weight and at a temperature of 230° C. The MFI of the heterophasic propylene copolymer was 7.8 dg/min measured in accordance with ISO1133-1:2011using a 2.16 kg weight and at a temperature of 230° C.

After the heterophasic propylene copolymer was mixed with the components shown in Table 1, the MFI of the resulting composition was 24 dg/min.

TABLE 1

| | |
|---|---|
| Peroxide (ppm) | 450 |
| Erucamide (ppm) | 2000 |
| HPN20E (ppm) | 250 |
| Talc (ppm) | 5000 |
| Irganox B225 FF (ppm) | 1000 |
| Calcium stearate (ppm) | 500 |

Pellets were made by compounding the heterophasic propylene copolymer (with additives in Table 1), an ethylene copolymer (when present, 5 wt % with respect to total) and talc (when present, 5 wt % with respect to total) as summarized in Tables 2 and 3 in a Kraus Maffei Berstorff twin screw extruder ZSK25, equipped with a shift screw, at 184RPM and a throughput of 13kg/hour. Table 3 summarizes various properties of the compositions obtained.

TABLE 2

| Ethylene polymer | Density (g/cm3) | MFI (g/10 min, 190° C./2.16 kg) |
|---|---|---|
| DOW Engage 8200 | 0.87 | 5 |
| DOW Engage 8402 | 0.902 | 30 |
| DOW Engage 8407 | 0.87 | 30 |
| SABIC Fortify C30070D | 0.868 | 30 |
| SABIC LDPE 2100TN | 0.921 | 0.33 |

TABLE 3-1

| | ethylene polymer (5 wt %) | Talc (5 wt %) | MFI (dg/min) | Gloss 20° | Izod impact 23° C. (kJ/m2) | Izod impact −20° C. (kJ/m2) | Flexural modulus (MPa) |
|---|---|---|---|---|---|---|---|
| CEx 1 | No | No | 24 | 70 | 6.0 | 2.3 | 1405 |
| CEx 2 | Engage 8200 | No | 23 | 75 | 9.8 | 3.0 | 1292 |
| Ex 3 | Engage 8402 | No | 24 | 75 | 12.6 | 2.4 | 1329 |
| Ex 4 | Engage 8407 | No | 25 | 76 | 35.2 | 3.2 | 1304 |
| CEx 5 | LDPE 2100tn | No | 21 | 60 | 6.9 | 2.8 | 1311 |
| CEx 6 | No | Yes | 23 | 58 | 6.0 | 2.4 | 1634 |
| CEx 7 | Fortify C30070D | Yes | 24 | 59 | 17.1 | 3.2 | 1500 |

TABLE 3-2

| | ethylene polymer (5 wt %) | Scratch 15N (dL) | Shrinkage (%) |
|---|---|---|---|
| CEx 1 | No | 1.75 | 1.38 |
| CEx 2 | Engage 8200 | 1.41 | 1.31 |
| Ex 3 | Engage 8402 | 0.74 | 1.41 |
| Ex 4 | Engage 8407 | 0.86 | 1.34 |
| CEx 5 | LDPE 2100tn | 9.53 | 1.43 |
| CEx 6 | No | 9.64 | 1.26 |
| CEx 7 | Fortify C30070D | 7.95 | 1.23 |

It can be understood that the combination of specific heterophasic propylene copolymer and the specific ethylene copolymer with a limited amount of talc leads to a very good balance of desirable properties, as in Ex 3 and Ex 4.

Comparison between CEx 2 and Ex 4 shows that the high MFI of the ethylene copolymer leads to better impact strength and better scratch resistance.

Comparison between Ex 3 and Ex 4 shows that the low density of the ethylene copolymer leads to better impact strength.

Comparison between CEx 7 and Ex 4 shows that the presence of 5 wt % of talc leads to a worse gloss, worse impact strength and worse scratch resistance.

CEx 5 which uses an ethylene homopolymer having a relatively high density resulted in a low gloss and a low impact strength.

The properties were measured as follows:

Melt Flow Index

The melt flow index of the composition was measured according to ISO1133-1:2011 at 230° C., 2.16kg.

Gloss

Gloss is the amount of light reflected in a certain direction by a surface of a sample made from the composition. The gloss was determined according to ISO 2813 and DIN67530 at a measurement angle of 20°. The samples used for this test are obtained by injection molding ISO 37/2 on the machine Arburg 60T, mould: 1-1-1-108, with geometry 65*65*3.2 mm.

Impact Strenqth

The impact strength was measured by Izod test according to ISO 180 4A. Samples were obtained by cutting injected plaques (ISO 37/2 on the machine Arburg 60T, mould: 1-1-1-108) into 65*12.7*3.2 mm in the parallel orientation of moulding with 45° notch, radius 0.25 mm. The test temperatures were 23° C. and −20° C.

Flexural Modulus

The flexural modulus was measured according to ISO178:2010 at 23° C. in parallel orientation (test specimen: 3.2 mm according to ISO 37/2).

Scratch Resistance

The pellets obtained were dry blended with 2 wt % of a black PE Colour masterbatch. The blends were injection moulded into test specimens using an Arburg 60T injection-moulding machine. For the scratch tests 65*65*3.2 mm thick test plaques were molded.

The scratch resistance test was measured according to the PV 3952 2002 scratch method of Volkswagen AG company on an Erichsen scratching device, with a load of 15N. The resulting value dL is a measure for the scratch resistance, a low dL value corresponding to high scratch resistance; this means that the scratch does not turn white but keeps the original colour of the scratched plaque. The colour change dL is the difference in the L values of CIELAB measured according to ASTM D6290-05 and ASTM E313.

Shrinkage

Shrinkage 3-D was measured according to ISO 294-4 as average shrinkage after conditioning for 24 hrs at 23° C.

The invention claimed is:

1. A composition comprising (A) a heterophasic propylene copolymer and (B) an ethylene copolymer of ethylene and an alpha-olefin comonomer units having 4 to 10 carbon atoms, wherein (A) the heterophasic propylene copolymer consists of
(a) a propylene-based matrix,
wherein the propylene-based matrix consists of a propylene homopolymer and
wherein the propylene-based matrix is present in an amount of 80 to 95 wt % based on a total weight of the heterophasic propylene copolymer and
(b) a dispersed ethylene-α-olefin copolymer which is an ethylene-propylene copolymer,
wherein the dispersed ethylene-α-olefin copolymer is present in an amount of 5 to 20 wt %, based on the total weight of the heterophasic propylene copolymer and
wherein a sum of a total amount of propylene-based matrix and a total amount of the dispersed ethylene-α-olefin copolymer in the heterophasic propylene copolymer is 100 wt %,
wherein an amount of ethylene in the ethylene-α-olefin copolymer of the heterophasic propylene copolymer is 10 to 45 wt %, with respect to the ethylene-α-olefin copolymer and
wherein (B) the ethylene copolymer has a density of to 0.850 to 0.910 g/cm³ and a melt flow index of 10.0 to 50.0 dg/min, measured in accordance with ASTM D1238 (2.16 kg/190° C.),
wherein the composition comprises less than 5 wt % of talc with respect to the total composition, and
wherein the composition further comprises (C) a C10-C30 aliphatic carboxylic acid amide, and
wherein a total amount of (A) and (B) is at least 95 wt %, with respect to the total composition.

2. The composition of claim 1, wherein the propylene-based matrix has a melt flow of 1.5 to 10 dg/min, measured according to ISO1133-1:2011 at 2.16 kg and 230° C.

3. The composition according to claim 1, wherein (B) has a density of 0.850 to 0.890 g/cm³.

4. The composition according to claim 1, wherein (B) is selected from the group consisting of ethylene-1-butene copolymer, ethylene-1-hexene copolymer, ethylene-1-octene copolymer and mixtures thereof.

5. The composition according to claim 1, wherein the C10-C30 aliphatic carboxylic acid amide is an unsaturated C10-C30 aliphatic carboxylic acid amide.

6. The composition according to claim 1, wherein the C10-C30 aliphatic carboxylic acid amide is selected from the group consisting of erucamide and oleamide.

7. The composition according to claim 1, wherein an amount of (C) in the composition is to 100 to 10000 ppm, with respect to an amount of (A) in the total composition.

8. The composition according to claim 1, wherein the composition further comprises (D) a nucleating agent.

9. The composition according to claim 8, wherein the nucleating agent comprises a first nucleating agent, which comprises a cyclic dicarboxylate salt compound; and a second nucleating agent, which comprises talc, wherein the cyclic dicarboxylate salt compound has the formula (I):

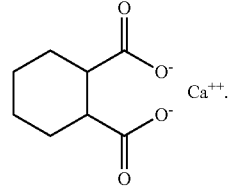

10. The composition of claim 9, wherein an amount of the first nucleating agent is 25 to 1000 ppm with respect to an amount of (A) in the total composition and an amount of talc in the composition is 1000 to 50000 ppm with respect to the amount of (A) in the total composition.

11. The composition according to claim 1, wherein the composition further comprises (E) additives comprising a UV stabilizer.

12. The composition according to claim 1, wherein the composition comprises less than 5 wt % of an inorganic filler with respect to the total composition.

13. The composition according to claim 1, wherein the composition has a gloss as determined according to ISO 2813 and DIN67530 at a measurement angle of 20° of at least 65 GU.

14. A process for the preparation of the composition according to claim 1, comprising melt mixing (A) and (B) and optional components.

15. An article comprising the composition of claim 1.

16. The article according to claim 15, wherein the article is an automotive part or a home appliance.

17. The article according to claim 15, wherein the article is an automotive interior part.

\* \* \* \* \*